United States Patent
Mochizuki et al.

(10) Patent No.: US 9,873,398 B2
(45) Date of Patent: Jan. 23, 2018

(54) VEHICLE INTERIOR STRUCTURE

(71) Applicant: Nissan Motor Co., Ltd., Kanagawa (JP)

(72) Inventors: Haruka Mochizuki, Kanagawa (JP); Wataru Suzuki, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/767,626

(22) PCT Filed: Dec. 20, 2013

(86) PCT No.: PCT/JP2013/084215
§ 371 (c)(1),
(2) Date: Aug. 13, 2015

(87) PCT Pub. No.: WO2014/129073
PCT Pub. Date: Aug. 28, 2014

(65) Prior Publication Data
US 2016/0001729 A1 Jan. 7, 2016

(30) Foreign Application Priority Data
Feb. 19, 2013 (JP) ................................ 2013-029931

(51) Int. Cl.
*B60R 21/12* (2006.01)
*B60R 21/02* (2006.01)

(52) U.S. Cl.
CPC ...... *B60R 21/12* (2013.01); *B60R 2021/0273* (2013.01)

(58) Field of Classification Search
CPC ...................................................... B60R 21/12
USPC ............ 296/191, 190.11, 24.4, 24.42, 24.43, 296/24.46
See application file for complete search history.

(56) References Cited

U.S. PATENT DOCUMENTS

| | | | | |
|---|---|---|---|---|
| 3,547,217 A | * | 12/1970 | Garza | 180/286 |
| 4,035,014 A | * | 7/1977 | Sellers | B60R 21/12 296/24.46 |
| 4,173,369 A | | 11/1979 | Roggin | |
| 4,971,378 A | * | 11/1990 | Setina | B60R 21/12 16/304 |

(Continued)

FOREIGN PATENT DOCUMENTS

| | | | | |
|---|---|---|---|---|
| FR | 2470713 A | * | 6/1981 | |
| GB | 2460695 A | * | 12/2009 | |

(Continued)

*Primary Examiner* — H Gutman
(74) *Attorney, Agent, or Firm* — Osha Liang LLP

(57) ABSTRACT

A vehicle interior structure has a driver's seat disposed inside a cabin, a rear passenger's seat disposed on a vehicle rear side of the driver's seat inside the cabin, and a partition panel arranged along a vehicle width direction between the driver's seat and the rear passenger's seat. Both ends of the partition panel in the vehicle width direction are disposed close to left and right side walls of the cabin, respectively. At least one of an upper edge and a lower edge of the partition panel is provided with a fragile section including a recess formed by a cutout extending toward a vertical center, and a protrusion protruding such that a distance from the vertical center to a tip of the protrusion in a vertical direction is greater than that of the recess.

1 Claim, 5 Drawing Sheets

(56) References Cited

U.S. PATENT DOCUMENTS

2006/0175856 A1     8/2006   Colin
2010/0201148 A1     8/2010   Storer et al.

FOREIGN PATENT DOCUMENTS

| JP | S61-024342 U | | 2/1986 |
| JP | 2009-046104 A | | 3/2009 |
| KR | 2016002805 U | * | 8/2016 |
| WO | 00/50269 A1 | | 8/2000 |
| WO | WO 2004113133 A1 | * | 12/2004 |
| WO | WO 2010131055 A1 | * | 11/2010 |

* cited by examiner

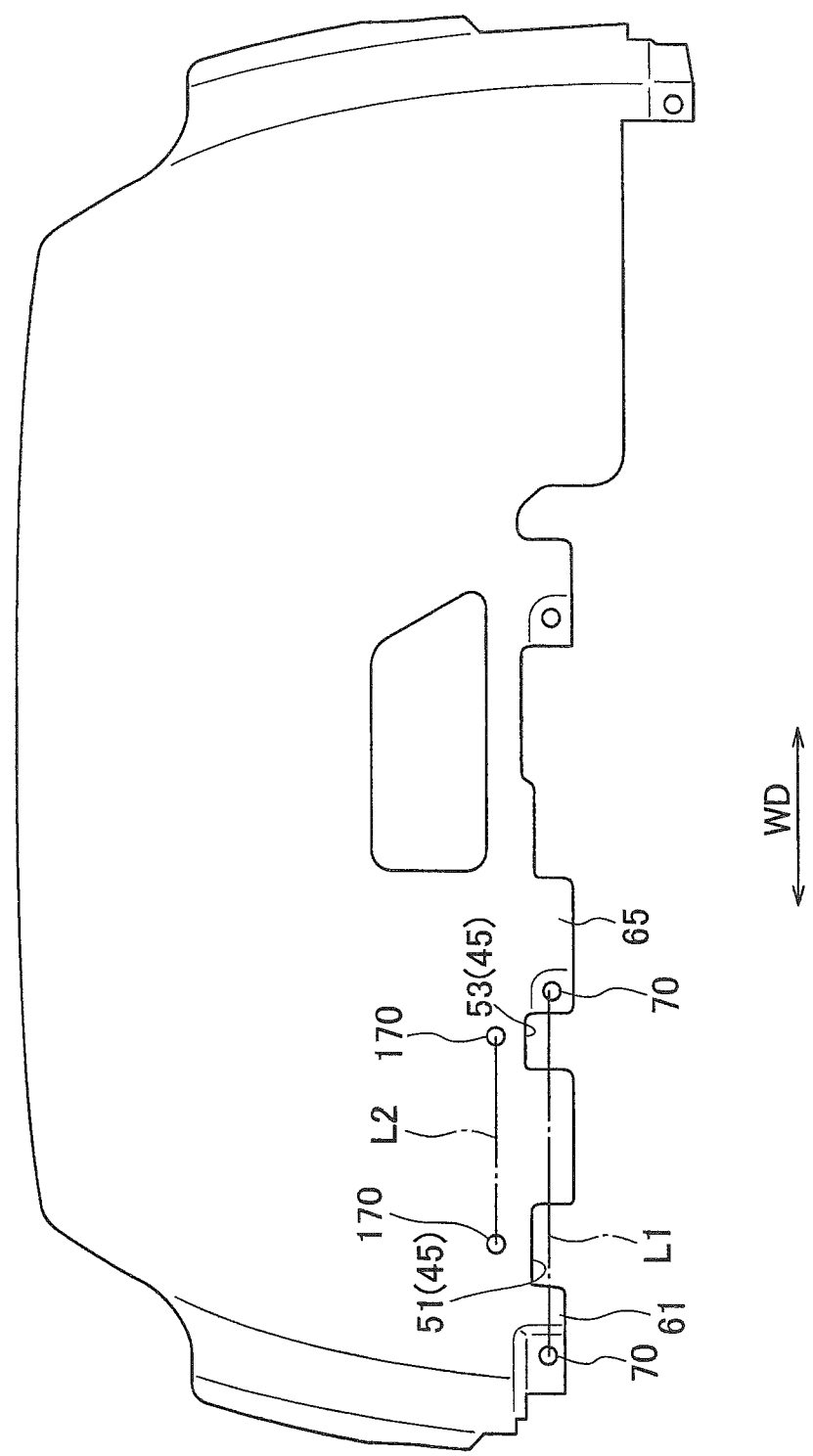

VEHICLE INTERIOR STRUCTURE

CROSS-REFERENCE TO RELATED APPLICATIONS

This application claims priority to Japanese Patent Application No. 2013-029931 filed on Feb. 19, 2013, the entire contents of which are incorporated herein by reference.

BACKGROUND

Technical Field

The present invention relates to a vehicle interior structure.

Related Art

For crime prevention of a vehicle such as a taxi, a technique has been known in which a partition panel is provided along the vehicle width direction between a driver's seat and rear passenger's seats behind the driver's seat (see Patent Literature 1). Clear polycarbonate, for example, has been widely used for this partition panel.

CITATION LIST

Patent Literature

Patent Literature 1: Japanese Patent Application Publication No. 2009-46104

SUMMARY

Here, a partition panel made of polycarbonate is formed thick in order to enhance its crime preventing performance, and therefore has high stiffness against compressive load in in-plane directions.

For this reason, when a side collision load is inputted to the vehicle from the lateral side, the partition panel interferes with the crush deformation of the vehicle body, thereby possibly increasing the impact load the vehicle receives.

One or more embodiments of the present invention provides a vehicle interior structure which, when a side collision load is inputted to the vehicle from the lateral side, prevents a partition panel from interfering with the crush deformation of the vehicle body and thereby reduces the impact load the vehicle receives.

One or more embodiments of the present invention provides a vehicle interior structure in which a partition panel is arranged between a driver's seat and a rear passenger's seat behind the driver's seat. At least one of the upper edge and the lower edge of the partition panel is provided with a fragile section including a recess and a protrusion. The recess is formed by a cutout extending toward the vertical center of the partition panel, and the protrusion protrudes such that the distance from the vertical center to the tip of the protrusion in the vertical direction is greater than that of the recess.

BRIEF DESCRIPTION OF DRAWINGS

FIG. 5 is a back view of the partition panel according to one or more embodiments of the present invention as seen from the rear, showing fixing portions of one or more embodiments of the present invention, and fixing portions in a comparative example.

DETAILED DESCRIPTION

Figure 1:
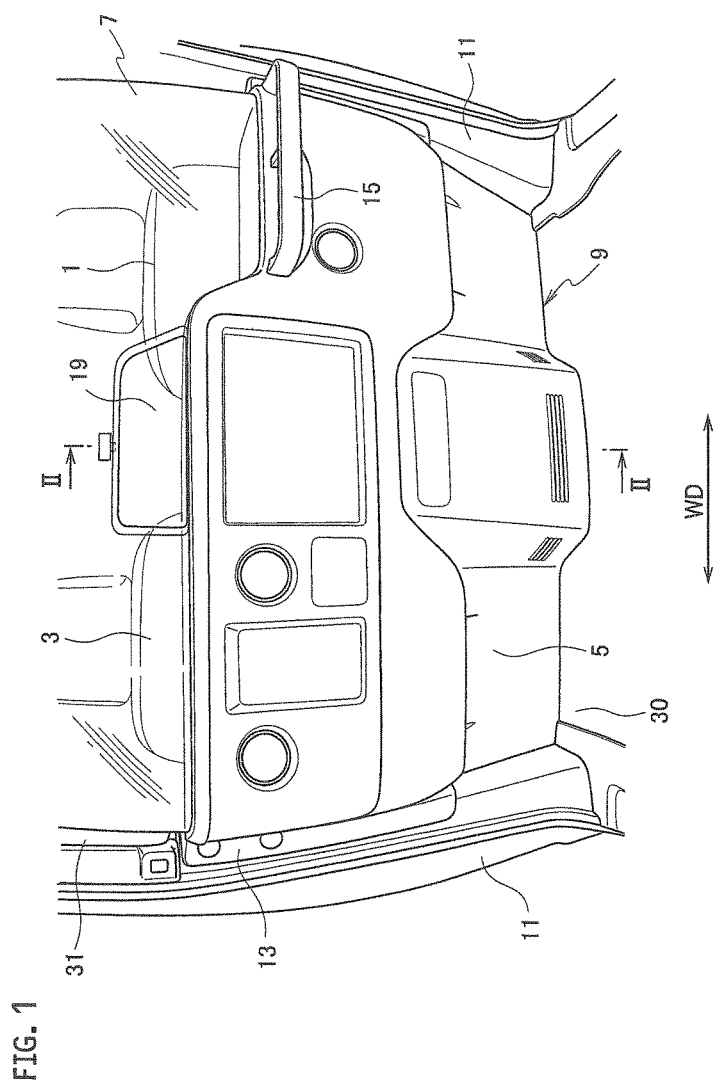
FIG. 1 is a perspective view of partition means according to one or more embodiments of the present invention as seen from the vehicle rear side.

Hereinbelow, a vehicle interior structure according to embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Note that in the drawings, FR, RR, UPR, and LWR denote the front side, rear side, upper side, and lower side of a vehicle, respectively, and WD denotes the vehicle width direction. Moreover, the following will describe a case where one or more embodiments of the present invention is applied to a vehicle such as a taxi in which passengers sit in the rear seats, for example. However, the present invention is not limited to such a vehicle.

As shown in FIG. 1, in a front area of a cabin, a driver's seat 1 is arranged on the right side, and a front passenger's seat 3 is arranged to the left of the driver's seat 1. Rear passenger's seats 4 (see FIG. 3) are arranged on the vehicle rear side of the driver's seat 1 and the front passenger's seat 3. Partition means 9 including a partition wall member 5 and a partition panel 7 is arranged along the vehicle width direction between the driver's seat 1 and the rear passenger's seats 4. By separating the driver's seat 1 and front passenger's seat 3 from the rear passenger's seats 4 with the partition means 9, vehicle interior structure exhibits a function of preventing crime in the vehicle such as a taxi.

Specifically, at left and right end areas in the vehicle width direction, a pair of left and right center pillars 11 extend in the vertical direction, respectively, and the partition wall member 5 extends in the vehicle width direction and connects these center pillars 11 and 11 to each other. More specifically, flange sections 13 protruding outward in the vehicle width direction are formed at both left and right ends of the partition wall member 5, and the flange sections 13 are coupled to the corresponding center pillars 11. Note that a fare receiving part 15 is provided on the rear side (rear passenger's seats 4 side) of a right end portion of the partition wall member 5. Fare and change are given and received between the driver and the passenger through this fare receiving part 15.

Figure 2:
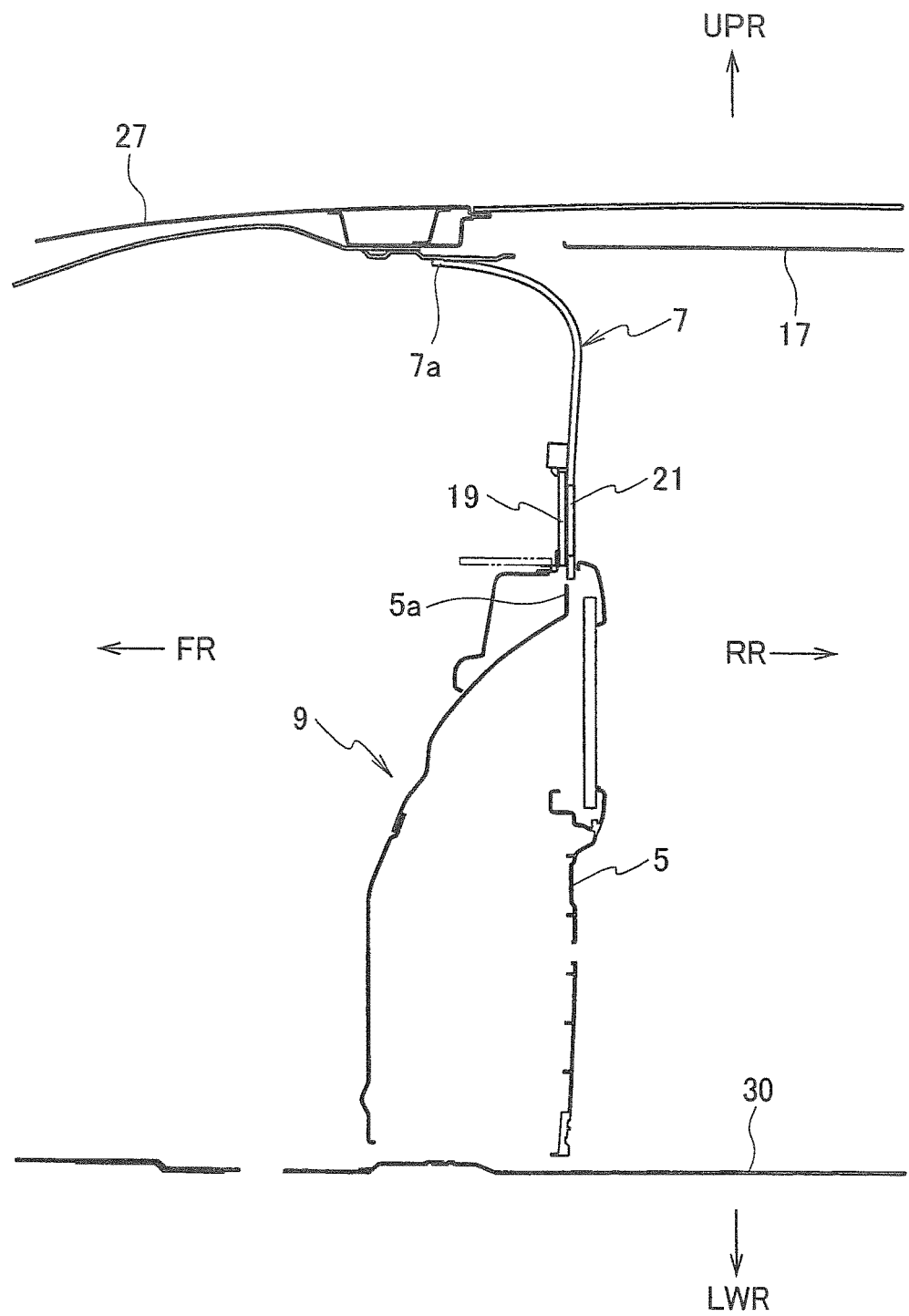
FIG. 2 is a cross-sectional view taken along line II-II in FIG. 1.

Moreover, the partition panel 7 made of clear polycarbonate is arranged along the vehicle width direction on top of the partition wall member 5. As shown in FIG. 2, an upper end portion 7a of the partition panel 7 is coupled to a ceiling interior member 17. Moreover, an openable-closable window 19 having a substantially rectangular shape in a front view is provided in a lower portion of a center section of the partition panel 7 in the vehicle width direction. This openable-closable window 19 is configured to be capable of opening and closing an opening portion 21 formed in the partition panel 7, and has an angular range of approximately 90° between the vehicle front side and the vehicle upper side as a range within which the openable-closable window 19 can turn about a lower end portion thereof By opening the openable-closable window 19, small articles such as a map can be given and received between the driver and the passenger through the opening portion 21. Note that a floor panel 30 is arranged under the partition wall member 5.

Figure 3:
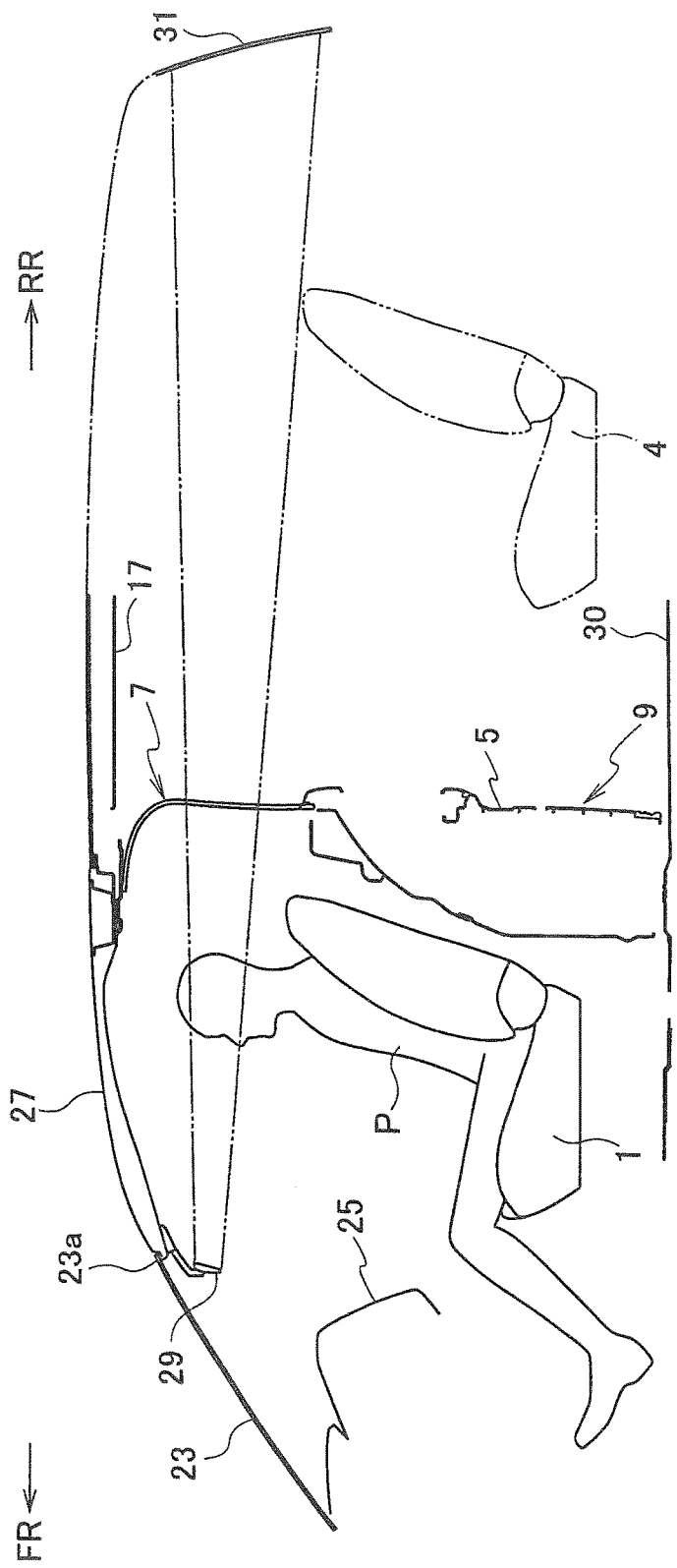
FIG. 3 is a schematic, side view showing the range of vision of the driver through a rear-view mirror.

As shown in FIG. 3, a front windshield 23 extends obliquely upwardly toward the rear from a vicinity of the front end of an instrument panel 25, and an upper end portion 23*a* thereof is supported on the front end of a roof 27. Moreover, a rear-view mirror 29 is arranged inside the cabin at the front end of the roof 27. Thus, as shown by two-dot chain lines, a driver P sitting in the driver's seat 1 can visually see the vehicle rear side through the clear partition panel 7 and a rear windshield 31.

Figure 4:
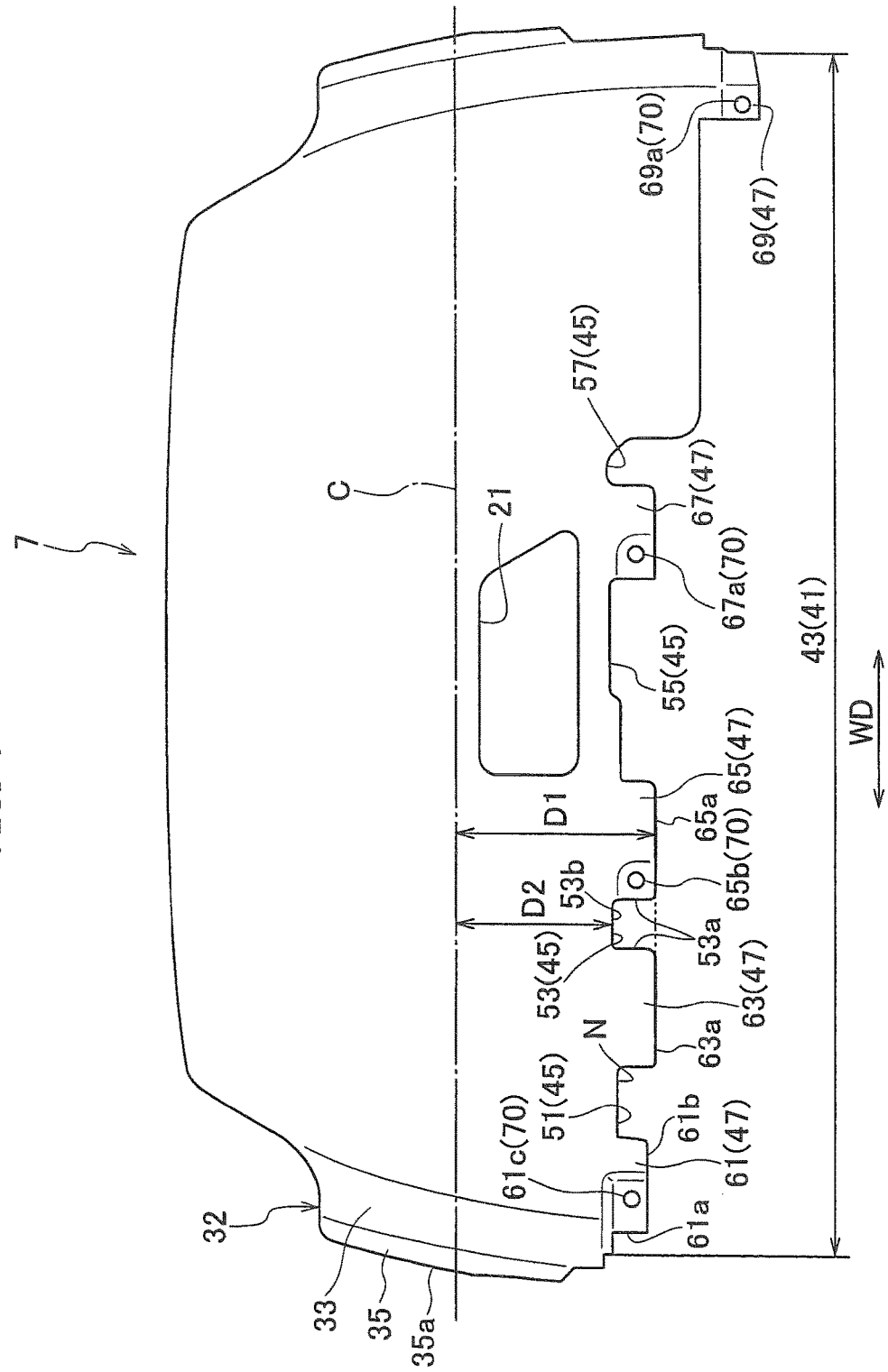
FIG. 4 is a back view of a partition panel according to one or more embodiments of the present invention as seen from the rear.

As shown in FIG. 4, the partition panel 7 is formed in a horizontally long rectangular shape when seen in the vehicle front-rear direction. A pair of flanges 32 extending in the vertical direction are formed on both left and right sides. Each flange 32 includes: a side surface portion 33 bending and then extending toward the vehicle front side; and a front surface portion 35 bending from the front edge of the side surface portion 33 and then extending outward in the vehicle width direction. A side end 35*a* of the front surface portion 35 is disposed near the corresponding center pillar 11 (see FIG. 1).

Moreover, a fragile section 43 is provided to a lower edge 41 of the partition panel 7. This fragile section 43 includes recesses 45 and protrusions 47.

The recesses 45 are formed by cutouts extending toward a vertical center line C (vertical center) (e.g. a center line of the maximum vertical width of the partition panel 7) extending in the vehicle width direction (left-right direction) through the center of the partition panel 7 in the vertical direction. Specifically, the recesses 45 are formed by rectangular cutouts N extending upward in a front view (or back view). In one or more embodiments of the present invention, the recesses 45 at four locations, namely, a first recess 51, a second recess 53, a third recess 55, and a fourth recess 57, are provided at the lower edge 41 of the partition panel 7 at predetermined intervals in the vehicle width direction. To describe them by taking the second recess 53 as an example, the periphery of the second recess 53 is formed in an inverted U-shape by a pair of vertical side edges 53*a* formed on both sides in the vehicle width direction and extending in the vertical direction and an upper edge 53*b* connecting the upper ends of the pair of vertical side edges 53*a* to each other in the vehicle width direction. To put it differently, the second recess 53 is a portion left after cutting a rectangular area surrounded by the vertical side edges 53*a*, the upper edge 53*b*, and a straight line (shown by a two-dot chain line) which extends in the vehicle width direction and connects a lower edge 63*a* of a later-mentioned second protrusion 63 and a lower edge 65*a* of a later-mentioned third protrusion 65 to each other.

The protrusions 47 are each formed to protrude such that the distance from the vertical center line C to the tip of the protrusion 47 in the vertical direction is greater than that of any recess 45. In one or more embodiments of the present invention, the recesses 47 at five locations, namely, a first protrusion 61, the second protrusion 63, the third protrusion 65, a fourth protrusion 67, and a fifth protrusion 69, are formed at the lower edge 41 of the partition panel 7 at predetermined intervals in the vehicle width direction. To describe them by taking the first protrusion 61 as an example, the periphery of the first protrusion 61 is fanned in a U-shape by a pair of vertical side edges 61*a* formed on both sides in the vehicle width direction and extending in the vertical direction, and a lower edge 61*b* (tip) connecting the lower ends of the pair of vertical side edges 61*a* to each other in the vehicle width direction. Here, the distance from the vertical center line C to the lower edge 65*a* (tip) of the third protrusion 65 in the vertical direction is D1, and the distance from the vertical center line C to the upper edge 53*b* of the second recess 53 in the vertical direction is D2. Moreover, they are formed such that the distance D1 is greater than the distance D2. Thus, the third protrusion 65 is formed such that the lower edge 65*a*, or the tip, protrudes downward beyond the adjacent second recess 53 and third recess 55.

Moreover, the first protrusion 61, the third protrusion 65, the fourth protrusion 67, and the fifth protrusion 69 are provided with fixing portions 70 for fixing these protrusions 47 to the partition wall member 5 (vehicle body member). Specifically, the fixing portions 70, namely, circular insertion holes 61*c*, 65*b*, 67*a*, and 69*a*, are formed in the first protrusion 61, the third protrusion 65, the fourth protrusion 67, and the fifth protrusion 69, respectively, and bolts not shown are inserted into these insertion holes 61*c*, 65*b*, 67*a*, and 69*a* and fastened to an upper end flange 5*a* (see FIG. 2) of the partition wall member 5. Note that the first recess 51 and the second recess 53 are disposed between the fixing portion 70 of the first protrusion 61 and the fixing portion 70 of the third protrusion 65. Moreover, the third recess 55 is disposed between the fixing portion 70 of the third protrusion 65 and the fixing portion 70 of the fourth protrusion 67. Furthermore, the fourth recess 57 is disposed between the fixing portion 70 of the fourth protrusion 67 and the fixing portion 70 of the fifth protrusion 69.

Hereinbelow, advantages of one or more embodiments of the present invention will be described. The below advantages are merely exemplary, advantages of one or more embodiments of the present invention are not limited to be below. Furthermore, the claims are not limited in any way by the exemplary advantages.

(1) At the lower edge 41 of the partition panel 7, the fragile section 43 is provided which includes: the recesses 45 formed by the cutouts N extending toward the vertical center line C (vertical center); and the protrusions 47 each protruding such that the distance D1 from the vertical center line C (vertical center) to the lower edge (tip) of the protrusion 47 in the vertical direction is greater than that of any recess 45.

As shown in FIG. 4, in one or more embodiments of the present invention, the recesses 45 are formed by the cutouts N extending toward the vertical center line C, and the protrusions 47 and the recesses 45 are formed at the lower edge 41 of the partition panel 7. In one or more embodiments of the present invention, when a compressive load is inputted to the partition panel 7 in the vehicle width direction, the load concentrates at the areas of the recesses 45 formed by the cutouts N, thus making these areas easily deformable and less resistant to the load. For this reason, the in-plane stiffness of the partition panel 7 against the load is lowered.

In contrast, in the case of a shape without the recesses nor the protrusions at the lower edge of the partition panel, i.e. in the case where the lower edge of the partition panel extends straight in the vehicle width direction, there are no recesses formed by cutouts. Then, load is received by the entire lower edge without concentrating at given spots. Thus, the in-plane stiffness against compressive load inputted in the vehicle width direction is high.

In one or more embodiments of the present invention, however, the fragile section 43 is provided to the lower edge 41 of the partition panel 7, thereby lowering the in-plane stiffness against load inputted in the vehicle width direction.

Thus, when a side collision load is inputted to the lateral side of the vehicle and a resultant load which causes compression inwardly in the vehicle width direction is inputted to the partition panel 7, the partition panel 7 is easily deformed, allowing the crush deformation of the vehicle body to proceed smoothly. Accordingly, the impact load the vehicle receives is reduced.

(2) The plurality of protrusions 47 are provided to the fragile section 43 of the partition panel 7, the fixing portions 70 for fixing the partition panel 7 to the partition wall member 5 (vehicle body member) are provided to at least two (four in one or more embodiments of the present invention) of the plurality of protrusions 47, and the recess 45 is disposed between these fixing portions 70 and 70.

As described above, in one or more embodiments of the present invention, the recess 45 is disposed between the fixing portions 70 and 70 provided to the protrusions 47. Specifically, as shown in FIG. 5, the fixing portions 70 are provided to the first protrusion 61 and the third protrusion 65. Also, along a straight line L1, which connects these fixing portions 70 and 70 to each other, in the vehicle width direction, there are the first recess 51 and the second recess 53 disposed on the straight line L1. Thus, when a side collision load is inputted to the vehicle body, a load is applied which compresses the partition wall member 5 in the vehicle width direction. In addition, a load is also applied which brings the first protrusion 61 and the third protrusion 65 fixed to the partition wall member 5 through the fixing portions 70 closer to each other in the vehicle width direction.

Here, load concentrates at the areas of the recesses 45 formed by the cutouts N, thereby making these areas easily deformable and thus lowering the resistance against the load. Accordingly, the in-plane stiffness of the partition panel 7 against the load is lowered. Thus, when a side collision load is inputted to the vehicle body, the deformation smoothly proceeds in such a direction that the partition wall member 5 and the partition panel 7 can be compressed in the vehicle width direction. Hence, the crush deformation of the vehicle body is not interfered, and the impact load the vehicle receives is reduced accordingly.

In contrast, suppose a comparative example where, as shown in FIG. 5, fixing portions 170 are provided above the first recess 51 and the second recess 53 and a straight line L2 connects these fixing portions 170 and 170 to each other, for example. In this case, along this straight line L2 in the vehicle width direction, there are no recesses 45 disposed on the straight line L2. Thus, the resistance against load that compresses the fixing portions 170 toward each other in the vehicle width direction is increased, thereby improving the in-plane stiffness of the partition panel 7. Thus, when a side collision load is inputted to the vehicle body, a compressive load is inputted to the partition panel 7 in the vehicle width direction through the partition wall member 5, but the high in-plane stiffness of the partition panel 7 reduces the deformation of the partition wall member 5, thereby preventing the crush deformation of the vehicle body from proceeding smoothly. Accordingly, the impact load the vehicle receives increases.

As described above, the crush deformation of the vehicle body upon input of a side collision load to the vehicle body proceeds more efficiently in one or more embodiments of the present invention example where the fixing portions 70 are provided to the protrusions 47, than in the comparative example where the fixing portions 170 are provided above the recesses 45.

Specific embodiments of the present invention are described above, but the above embodiments are mere examples illustrated for the purpose of facilitating understanding of the present invention, and the present invention is not limited to the above embodiments. The technical scope of the present invention is not limited to the specific technical matters disclosed in the above embodiments, but encompasses various modifications, changes, alternative techniques, and the like which can be easily derived therefrom.

For example, while the fragile section 43 is provided to the lower edge 41 of the partition panel 7 in one or more of the above embodiments, the fragile section may be provided to the upper edge, or the fragile section 43 may be provided to both the upper edge and the lower edge 41.

Moreover, while the fragile section 43 is a section formed by the recesses 45 and the protrusions 47 in one or more of the above embodiments, shapes other than those of the recesses 45 and the protrusions 47 may be employed as long as the shapes allow fragility against load in the vehicle width direction.

With the vehicle interior structure according to one or more embodiments of the present invention, when a load which causes compression in the vehicle width direction is inputted to the partition panel, the load concentrates at the recesses, thereby allowing easier deformation. Thus, the resistance of the partition panel against the load is lowered, thereby lowering the in-plane stiffness thereof. Then, when a side collision load is inputted to the lateral side of the vehicle body and a load which causes compression inwardly in the vehicle width direction is inputted to the partition panel, the partition panel is easily deformed, thereby allowing the crush deformation of the vehicle body to proceed smoothly. Accordingly, the impact load the vehicle receives is reduced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 driver's seat
4 rear passenger's seat
7 partition panel
41 lower edge
45 recess
47 protrusion
70 fixing portion
C vertical center line (vertical center)
N cutout

The invention claimed is:

1. A vehicle interior structure comprising:
a driver's seat disposed inside a cabin;
a rear passenger's seat disposed on a vehicle rear side of the driver's seat inside the cabin;
a partition wall member arranged along a vehicle width direction between the driver's seat and the rear passenger's seat;
a partition panel made of polycarbonate arranged on top of the partition wall member; and
a floor panel arranged under the partition wall member, wherein both ends of the partition wall member in the vehicle width direction are coupled to corresponding left and right side center pillars of the cabin, respectively, wherein both ends of the partition panel in the vehicle width direction are disposed close to the left and right side center pillars of the cabin, respectively, wherein a lower edge of the partition panel is in an upper side from a vertical center of a portion of the cabin in which the partition panel is disposed, and wherein a lower edge of the partition panel is provided with a fragile section made of polycarbonate including a recess formed by a cutout extending toward a vertical center of the partition panel, and a protrusion made of polycarbonate protruding such that a distance from the vertical center of the partition panel to a tip of the protrusion in a vertical direction is greater than that of the recess, wherein fixing portions configured to have bolts inserted therein to non-rotatably fasten the partition panel to the partition wall member are disposed on at least two of the plurality of protrusions, and wherein the recess is disposed on a straight line which connects the fixing portions.

\* \* \* \* \*